United States Patent [19]

Maben

[11] 4,107,737
[45] Aug. 15, 1978

[54] SYNCHRONIZATION SIGNAL POWERED TELEVISION TRANSMITTER

[75] Inventor: James W. Maben, Brookline, N.H.

[73] Assignee: Sanders Associates, Inc., Nashua, N.H.

[21] Appl. No.: 761,735

[22] Filed: Jan. 24, 1977

[51] Int. Cl.² .................. H04N 7/18; A63B 71/04
[52] U.S. Cl. .................. 358/93; 273/1 E; 273/DIG. 28; 358/190
[58] Field of Search ............. 35/48 R; 273/1 E, 85 R, 273/102.2 R, 102.2 B, 101.1, DIG. 28, 1, 85, 102.2; 340/323 R, 324 AD, 416, 224, 323, 324; 343/225; 325/492, 308; 358/86, 190, 160

[56] References Cited

U.S. PATENT DOCUMENTS

| 3,361,977 | 1/1968 | Winkle et al. ............... 325/492 |
| 3,555,430 | 1/1971 | Fisher et al. ............... 358/86 |
| 3,562,650 | 2/1971 | Gossard et al. ............. 325/308 |
| 3,659,285 | 4/1972 | Baer et al. ................. 273/85 R |
| 3,758,775 | 9/1973 | Hopkins ..................... 340/416 X |

OTHER PUBLICATIONS

Popular Science; "New Radio Steals Its Power From The Air;" Apr. 1958; pp. 108, 109.

*Primary Examiner*—Vance Y. Hum
*Attorney, Agent, or Firm*—Louis Etlinger; Richard I. Seligman

[57] ABSTRACT

Power for an r.f. oscillator/modulator located at the antenna input terminals of a television receiver is derived from synchronization signals generated remotely from the receiver and applied to the r.f. oscillator/modulator via a cable.

11 Claims, 4 Drawing Figures

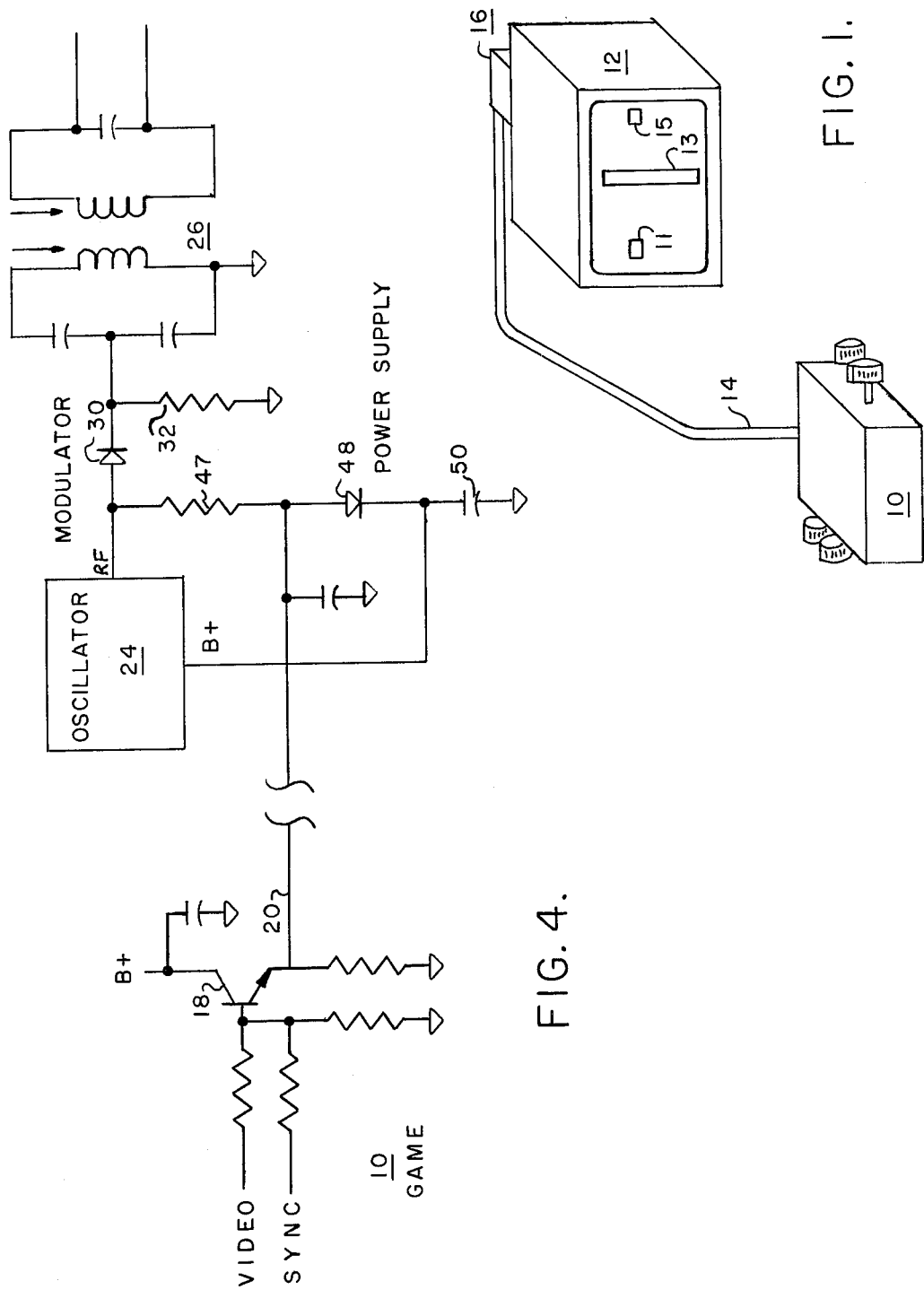

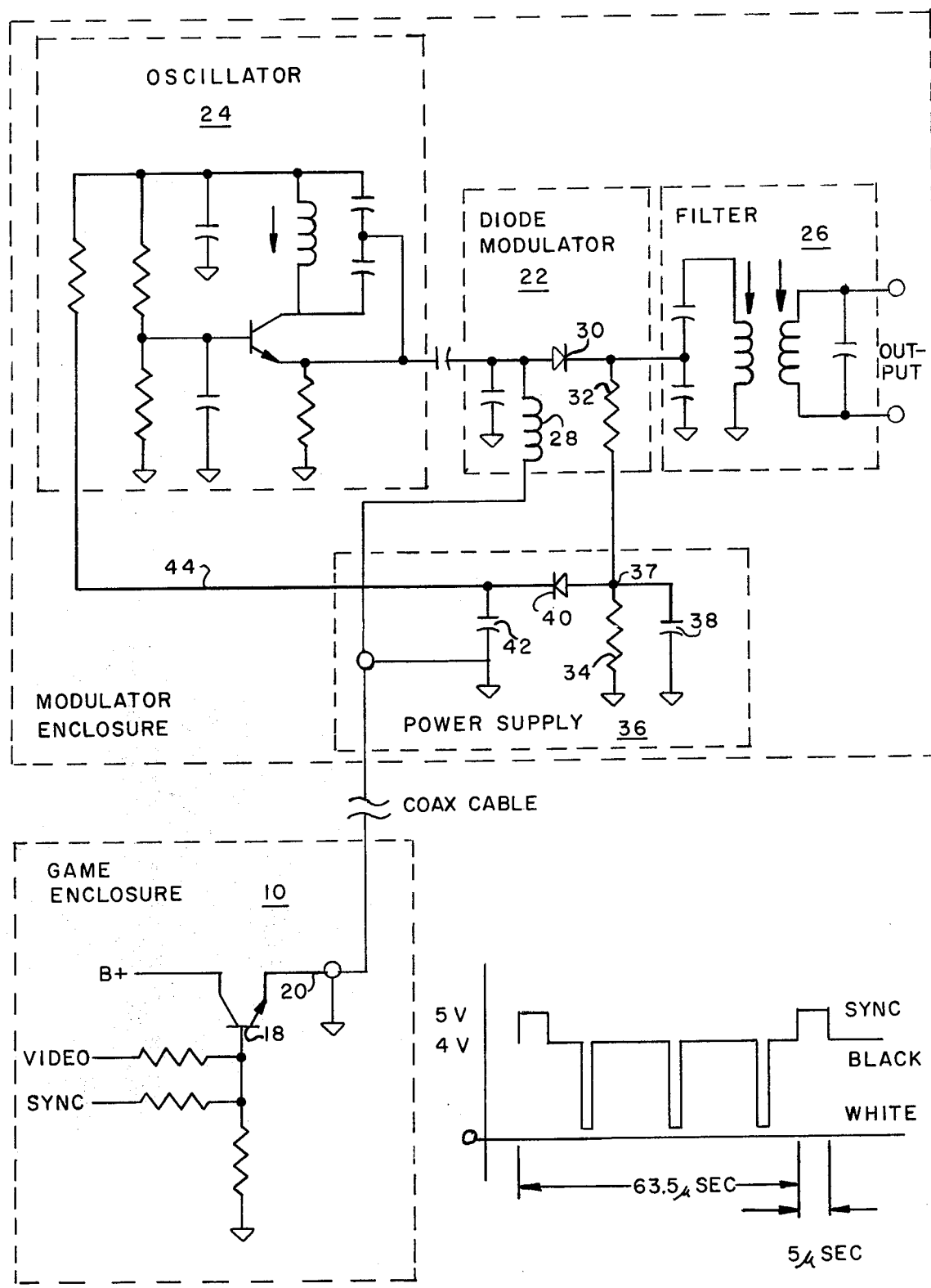

SYNCHRONIZATION SIGNAL POWERED TELEVISION TRANSMITTER

BACKGROUND OF THE INVENTION

The market place is replete with all manner of devices for playing games on a television receiver by generating video and synchronization signals which can be coupled to the antenna terminals of a home television receiver. Such game playing devices are well illustrated by U.S. Pat. Nos. 3,728,480; 3,778,058; 3,829,095; Re 28,507 and Re 28,598. The electronic game playing devices represented by these patents are game attachments for a raster scan display such as a home television receiver or television monitor and having electrical circuitry or components for generating signals which, when supplied to the raster scan display, will cause the display to show on the screen thereof moveable game playing indicia or symbols or spots.

When employing these game playing devices in conjunction with a home television receiver which normally is used for receiving broadcast programs, the output of the game playing devices is coupled to the antenna terminals of the television receiver. The game devices gain access to the television receiver via an r.f. oscillator and modulator. This unit generates an r.f. output typically on channel 3 or channel 4 which is modulated by the composite synchronization and video signal generated by the game playing circuits. A typical unit consists of an oscillator, a diode modulator and a bandpass filter. The output of the game device is conducted by a coaxial cable to the television receiver, where an impedance transformer is used to match the coaxial cable to the 300 ohm impedance of the television receiver.

Considerable difficulty has been experienced in suppression of the radiation from the r.f. oscillator and modulator to a level which will not cause interference to other television receivers operating on the same channel as the game. The radiation limit is established by FCC regulations.

One technique for reducing radiation is to locate the r.f. oscillator and modulator at the television receiver rather than at the game box and thus eliminate the transmission of r.f. energy over a length of cable from the game box to the television receiver. The problem with this solution is that the r.f. oscillator requires electrical power necessitating that in addition to the coaxial cable to carry video and synchronization signals from the game box to the modulator and oscillator, another conductor must be supplied to bring power to the oscillator. Alternatively, d.c. power can be applied via the coaxial cable outer conductor, however, resistors or chokes are then required to prevent shorting out of the video and synchronization signals.

SUMMARY OF THE INVENTION

Accordingly, it is an object of this invention to provide means for supplying power to a remotely located oscillator in a television game device without requiring the necessity of additional conductors or complex d.c. and signal decoupling.

Briefly, in a video game system, power is supplied to the oscillator of a remotely located oscillator/modulator by tapping off a portion of the composite video and sync signal applied to the remotely located modulator and extracting from the synchronization signal a d.c. component which is used to power the oscillator.

BRIEF DESCRIPTION OF THE DRAWINGS

The above-mentioned and other features and objects of this invention will become more apparent by reference to the following description taken in conjunction with the accompanying drawings, in which:

FIG. 1 is a pictorial view illustrating connection of a game box to a television receiver;

FIG. 2 is a schematic diagram of a portion of a television game circuit;

FIG. 3 is a waveform of a typical television signal generated by the game box of FIG. 1; and FIG. 4 is a schematic diagram of an alternate embodiment to that of FIG. 2.

DESCRIPTION OF PREFERRED EMBODIMENTS

Referring now to FIG. 1 of the drawings, there is illustrated thereby a game box 10 including video and synchronization signal generators for generating symbols 11, 13 and 15 which are to be displayed on the screen of a television receiver 12. Conventionally, these signals modulate an r.f. oscillator the output of which is applied to the antenna terminals of television receiver 12 via a cable 14. Generally, the oscillator and modulator are incorporated in the game box 10 along with the video and synchronization signal generators. However, because of the desirability of eliminating the transmission of r.f. energy over cable 14 the oscillator and modulator is preferably located at the receiver 12 in a unit 16. Priorly, this necessitated that in addition to wire 14 for carrying the video and synchronization signals to the modulator and r.f. oscillator in unit 16, an additional wire had to be supplied to bring d.c. power to the unit 16 for powering the oscillator therein. This is eliminated by employing the system shown in FIG. 2.

In FIG. 2, the game box 10 includes among other things (not shown), a transistor 18 at which the generated video and synchronization signals are combined. The composite signal from transistor 18, which typically appears like that shown in FIG. 3, is applied to a cable 20 for coupling the signal from game box 10 located generally at some distance from television receiver 12 to an r.f. oscillator/modulator located proximate the antenna terminals of a television receiver. Cable 20 is coupled to a diode modulator 22 to modulate the output from an oscillator 24, the output from diode modulator 22 being coupled via a filter 26 to the antenna terminals of television receiver 12. The oscillator 24, diode modulator 22 and filter 26 are located in unit 16.

Since the oscillator 24 requires d.c. power, the composite video signal is employed to generate same as shown. The composite signal is applied to the modulator across the series combination of an inductor 28, a diode 30, a resistor 32 and a resistor 34. Resistor 34 forms a portion of a power supply 36 to generate the required d.c. voltage for powering oscillator 24. Power supply 36 is also located in unit 16. Power supply 36 additionally includes a capacitor 38 in parallel with resistor 34, a diode 40 coupled to resistor 34 and a capacitor 42.

The current flow through inductor 28, diode 30 and resistors 32 and 34 is determined primarily by resistor 34 which is made very much larger than resistor 32. In a typical embodiment resistor 34 is 4700 ohms while resistor 32 is only 100 ohms. Accordingly, most of the composite video signal appears at the junction 37 of diode 40, resistor 34 and capacitor 38 whereby during each horizontal synchronization pulse the point 37 reaches a significant voltage on the order of more than 4 volts causing capacitor 42 to charge to a voltage somewhat less than this, for example, 3.4 volts. Following the receipt of a horizontal synchronization pulse, diode 40 stops conducting and the charge on capacitor 42 is used to power oscillator 24 via a connection 44.

The low power drain of oscillator 24 allows operation with a small voltage drop between horizontal synchronization pulses. With a discharge time constant of in the order of 1 millisecond less than 10% reduction in voltage will occur during a line interval (63.5 microseconds).

In an alternate embodiment illustrated in FIG. 4 of the drawings the power supply is situated in parallel with the modulator and not in series as in the embodiment of FIG. 2. In this embodiment, the anode of a diode 48 is coupled to a resistor 47 of the modulator. The cathode thereof is coupled to a capacitor 50. The output d.c. voltage to supply oscillator 24 is taken at the junction of diode 48 and capacitor 50.

Although the invention has been described in conjunction with a video game generator, the techniques are applicable to any system used in conjunction with a television receiver wherein synchronization signals are generated in conjunction with apparatus to directly couple information to the antenna terminals of a television receiver. Thus, it is to be understood that the embodiments shown are to be regarded as illustrative only and that many variations and modifications can be made without departing from the principles of the invention herein disclosed and defined by the appended claims.

I claim:

1. Apparatus for generating d.c. power at an electrical circuit requiring said d.c. power and remotely located from a source of synchronization signals, comprising:
    means coupled to the source of synchronization signals for generating substantially d.c. power from said synchronization signals; and
    means coupling said means for generating substantially d.c. power to the electrical circuit.

2. Apparatus as defined in claim 1, wherein said means for generating d.c. power includes a diode coupled to the means for generating synchronization signals.

3. Apparatus as defined in claim 2, wherein said means for generating d.c. power further includes a capacitor coupled to said diode.

4. Apparatus for generating d.c. power at an electrical circuit remotely located from a video and synchronization signal generator, comprising:
    means for generating synchronization signals;
    an electrical circuit requiring d.c. power remotely located from said means for generating synchronization signals;
    means coupled to said means for generating synchronization signals for generating substantially d.c. power from said synchronization pulses; and
    means coupling said means for generating substantially d.c. power to said electrical circuit.

5. Apparatus as defined in claim 4, wherein said means for generating substantially d.c. power includes:
    a diode coupled to said means for generating synchronization signals; and
    filtering means coupled to said diode.

6. Apparatus as defined in claim 5, wherein said filtering means includes a capacitor.

7. Apparatus for generating d.c. power for an oscillator positioned along with a modulator proximate the antenna terminals of a television receiver from a video and synchronization signal generator remotely located from the television receiver and hard wire coupled to the modulator, comprising:
    a video generator for generating video and synchronization signals for providing information on the screen of a television receiver via the antenna terminals of the receiver;
    an r.f. oscillator located proximate the antenna terminals of a television receiver;
    a modulator coupled to said oscillator and said video generator for modulating the output of said oscillator with said video and synchronization signals;
    power supply means located proximate said modulator and coupled to said video generator for generating substantially d.c. power from the signals from said video generator; and
    means coupling said power supply means to said oscillator.

8. Apparatus as defined in claim 7, wherein said power supply means is connected in parallel with said modulator.

9. Apparatus as defined in claim 8, wherein said power supply includes a diode coupled to said video generator and a capacitor with the junction of said diode and capacitor being coupled to said oscillator.

10. Apparatus as defined in claim 7, wherein said power supply means is connected in series with said modulator.

11. Apparatus as defined in claim 10, wherein said power supply includes:
    a resistor in series with said modulator for coupling the output of said video generator to said power supply;
    a capacitor shunting said resistor;
    a diode coupled at one terminal to said resistor; and
    a capacitor coupling the other terminal of said diode to ground.

* * * * *